United States Patent
Ouyang et al.

(10) Patent No.: US 9,531,867 B2
(45) Date of Patent: Dec. 27, 2016

(54) METHODS AND SYSTEMS FOR DETERMINING A VOICE QUALITY SCORE FOR A MOBILE TELEPHONE

(71) Applicant: Verizon Patent and Licensing Inc., Arlington, VA (US)

(72) Inventors: Ye Ouyang, Piscataway, NJ (US); Carol Becht, Boonton, NJ (US); Krishna Pichumani Iyer, Aurora, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 100 days.

(21) Appl. No.: 14/675,496

(22) Filed: Mar. 31, 2015

(65) Prior Publication Data
US 2016/0295012 A1  Oct. 6, 2016

(51) Int. Cl.
 H04W 24/00 (2009.01)
 H04M 3/22 (2006.01)
 H04W 24/08 (2009.01)
 H04B 17/309 (2015.01)

(52) U.S. Cl.
 CPC ......... *H04M 3/2227* (2013.01); *H04B 17/309* (2015.01); *H04W 24/08* (2013.01)

(58) Field of Classification Search
 CPC .... H04M 3/2227; H04W 24/08; H04B 17/309
 USPC .......................................................... 370/252
 See application file for complete search history.

(56) References Cited

U.S. PATENT DOCUMENTS

| | | | |
|---|---|---|---|
| 9,136,998 B2* | 9/2015 | Che .................... | H04L 5/001 |
| 2001/0022558 A1* | 9/2001 | Karr, Jr. ................ | G01S 1/026 |
| | | | 342/450 |
| 2012/0190380 A1* | 7/2012 | Dupray ................ | G01S 1/026 |
| | | | 455/456.1 |

* cited by examiner

*Primary Examiner* — Wei Zhao (57) ABSTRACT

An exemplary method includes a voice quality assessment system receiving, from a mobile telephone operating on a mobile network, a test record that includes network indicator data and radio frequency ("RF") data both measured by the mobile telephone while the mobile telephone is at a location within the mobile network, and applying the network indicator data and the RF data to a voice quality model built using data provided by a plurality of mobile telephones operating on the mobile network in order to generate a voice quality score that quantifies a quality of voice communications for the mobile telephone at the location within the mobile network. Corresponding systems and methods are also described.

20 Claims, 9 Drawing Sheets

```
Input: AC_i: the audio clip of the i_th record;
       RF: RF features each record;
       NR: network indicators each record.
       Training phase: Record: V_i^R =< AC_i, RF, NR >
       Testing phase: Record: V_i^T =< RF, NR >
Output: Training phase: A voice quality model: K RF quality
        groups, each having M_K clusters, and inside each cluster, the
        NR is associated and regressed to POLQA scores.
        Testing phase: Estimated POLQA score.
   // Training phase
 1: for (V_i^R in V^R) do
 2:    Compute POLQA score S_i
 3:    Classify V_i^T into one of the K quality groups based on its
       RF
 4: end for
 5: for (i=1:K) do
 6:    Compute SSD for all the NR
 7:    Select NR_s ⊆ NR with SSD_{NR} ≥ 0.5
 8:    Do K-Medoids clustering to records using NR_s as features,
       and generate M_K clusters
 9:    for (j=1:m) do
10:       Use A-LOESS to build regression model between S and
          NR_s
11:    end for
12: end for
   // Testing phase
13: for (V_i^T in V^T) do
14:    Assign V_i^T to an RF group based on its RF
15:    Assign V_i^T to a cluster based on its NR_s
16:    Compute its POLQA score S_i based on the trained A-LOESS
       model
17: end for
```

METHODS AND SYSTEMS FOR DETERMINING A VOICE QUALITY SCORE FOR A MOBILE TELEPHONE

BACKGROUND INFORMATION

Despite the new capabilities and applications developed for mobile telephones each year, voice calls remain one of the most important functions for users of mobile telephones. Accordingly, mobile carriers are constantly trying to improve the quality of voice calls (also referred to as "voice quality") within their mobile networks. For example, providers of Voice Over Long Term Evolution (VoLTE) call services, which have been adopted by many mobile carriers as their de-facto voice call solution in fourth generation mobile networks, are constantly assessing and trying to improve voice quality of telephone calls made using VoLTE.

To assess voice quality within a mobile network, conventional techniques focus on directly evaluating the audio quality of speech included in voice calls. For example, Perceptual Objective Listening Quality Assessment ("POLQA") is a standard provided by the International Telecommunication Union Telecommunication Standardization Sector ("ITU-T") that compares recorded audio clips taken from voice calls between mobile telephones with pre-recorded reference sentences in order to provide objective voice quality evaluation.

Unfortunately, POLQA and other techniques that directly evaluate audio features are extremely cumbersome and costly. For example, each evaluation requires professional hardware, such as high definition recorders, headphones, and playback devices, as well as significant human effort. Hence, direct evaluation of audio features is difficult to perform on a large-scale basis. Moreover, the direct evaluation of audio features does not analyze the root cause of poor voice quality, and is thus unable to provide a mobile carrier with sufficient information gain (entropy) that allows the mobile carrier to optimize one or more aspects of the mobile network in order to remedy the poor voice quality.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for determining a voice quality score for a mobile telephone are described herein. As will be described below, a voice quality assessment system may receive, from a mobile telephone operating on a mobile network, a test record that includes network indicator data and radio frequency ("RF") data both measured by the mobile telephone while the mobile telephone is at a location within the mobile network. The network indicator data represents a value of a network performance attribute of the mobile network at the location within the mobile network and the RF data represents a value of an RF quality of the mobile network at the location within the mobile network. The voice quality assessment system may generate a voice quality score that quantifies a quality of the voice communications for the mobile telephone at the location within the mobile network by applying the network indicator data and the RF data to a voice quality model built using data provided by a plurality of mobile telephones operating on the mobile network. Exemplary manners in which the voice quality model may be built and used to generate the voice quality score will be described herein.

The methods and systems described herein may facilitate voice quality assessment based on network indicator data and RF data measured by a mobile telephone. By not basing the voice quality assessment on audio features (i.e., recorded audio clips), the methods and systems may minimize the hardware and human effort needed to determine voice quality scores on a large-scale basis within a mobile network. Moreover, the methods and systems provide a quantified causal relationship between voice quality and deviation in network conditions, and may thereby allow a mobile carrier to more readily assess and remedy issues within the mobile network that cause poor voice quality. As will be described below, the voice quality model used in accordance with the methods and systems described herein may be calibrated to output voice quality scores that are within a predetermined percentage of voice quality scores generated by a POLQA system. Hence, the voice quality scores generated by the methods and systems described herein may be comparable to those generated by POLQA, which is the recognized standard for quantified voice quality scores.

Figure 1:
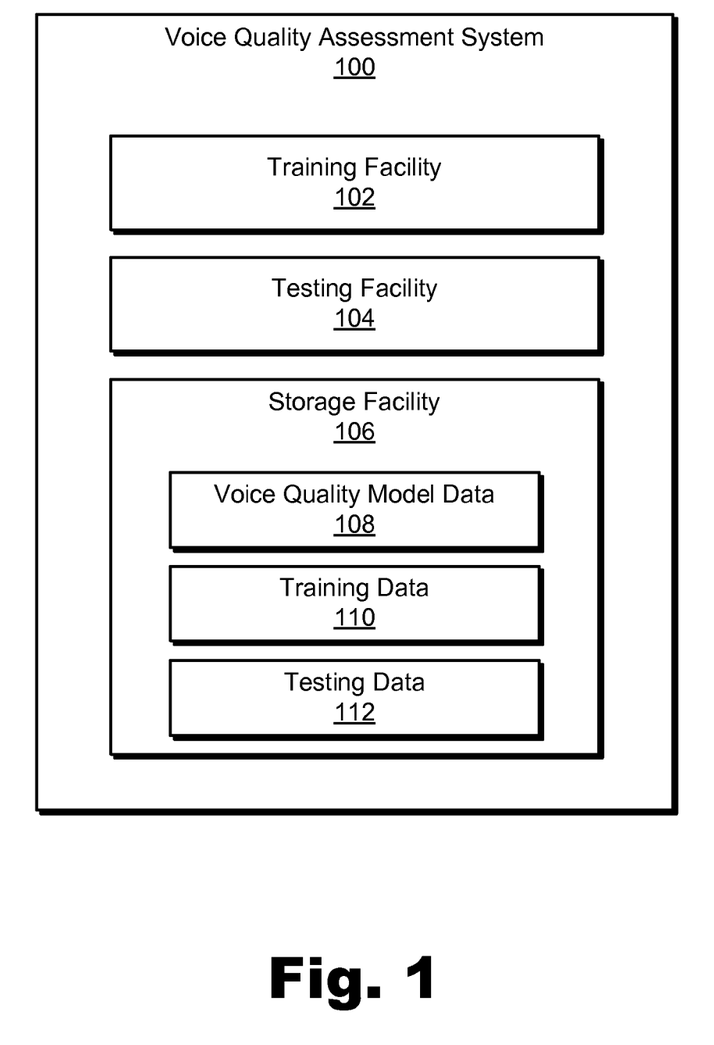
FIG. 1 illustrates an exemplary voice quality assessment system according to principles described herein.

FIG. 1 illustrates an exemplary voice quality assessment system 100 ("system 100") configured to assess voice quality of mobile telephones operating on a mobile network. As shown, system 100 may include, without limitation, a training facility 102, a testing facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices specifically configured to perform one or more of the operations described herein. In such implementations, system 100 may be referred to as a computer-implemented system 100.

Storage facility 106 may store detection data generated and/or used by training facility 102 and/or testing facility 104. For example, storage facility 106 may store voice quality model data 108 representative of a voice quality model built by training facility 102, training data 110 used by training facility 102 to build the voice quality model, and testing data 112 used by testing facility 104 to generate a voice quality score for a mobile telephone. Storage facility 106 may store additional or alternative data as may serve a particular implementation. Data stored by storage facility 106 may be accessed by system 100 from any suitable source, including a source internal or external to system 100.

Training facility 102 may build a voice quality model that may be used to generate voice quality scores that quantify a quality of voice communications for mobile telephones at various locations within a mobile network. Various ways in which training facility 102 may build the voice quality model will be described in more detail below.

Testing facility 104 may use the voice quality model built by training facility 102 to generate or derive a voice quality score for a mobile telephone operating on a mobile network. To this end, testing facility 104 may receive, from a mobile telephone operating on a mobile network, a test record that includes network indicator data and RF data both measured by the mobile telephone while the mobile telephone is at a location within the mobile network. The network indicator data may represent one or more values of one or more network performance attributes of the mobile network at the location within the mobile network. The RF data may indicate an RF quality (e.g., one or more values of one or more RF quality factors) of the mobile network at the location within the mobile network. In some examples, the test record may further include device indicator data that represents a value of a device performance of the mobile telephone at the location within the mobile network. Exemplary device performance attributes include, but are not limited to, memory usage, CPU usage, application memory usage, free space, and battery usage.

As used herein, a "network performance attribute" (also referred to as a "network indicator") refers to an attribute of a mobile network that affects performance of the mobile network. Exemplary network performance attributes include, but are not limited to, downlink throughput ("MAC.DL.Throughput"), physical downlink shared channel throughput ("PDSCH.Throughput"), radio control link downlink throughput ("RLC. DL.Throughput"), real-time transport protocol ("RTP") audio transmission throughput ("RTP.Audio.Tx.Throughput"), RTP audio receiving throughput ("RTP.Audio.Rx.Throughput"), packet data convergence protocol downlink throughput ("PDCP. DL.Throughput"), RTP audio receiving delay ("RTP.Audio.Rx.Delay"), RTP receiving jitter ("RTP.Audio.Rx.Jitter"), and handover happening ("Handover.Happening"). As will be described below, some network performance attributes affect network performance more than others.

As used herein, an "RF quality" of a mobile network refers to a network coverage strength and/or an interference condition at a particular location within the mobile network. Network coverage strength may be quantitatively represented by a reference signal received power ("RSRP") value, which is a direct cell signal strength indicator. The interference condition may be quantitatively represented by a signal-to-interference-plus-noise ratio ("SINR"). The network coverage strength and interference condition may be represented by any other suitable metric as may serve a particular implementation.

Upon receipt of the test record, testing facility 104 may apply the network indicator data and the RF data included in the test record to a voice quality model built by training facility 102. This may include assigning, based on the RF data, the test record to an RF quality class included in a plurality of RF quality classes that are a part of the voice quality model, assigning, based on the network indicator data, the test record to a cluster included in a plurality of clusters within the RF quality class, and generating, based on the assigned cluster and the assigned RF quality class, a voice quality score that quantifies a quality of voice communications for the mobile telephone at the location within the mobile network. Each of these operations will be described in more detail below.

Figure 2:
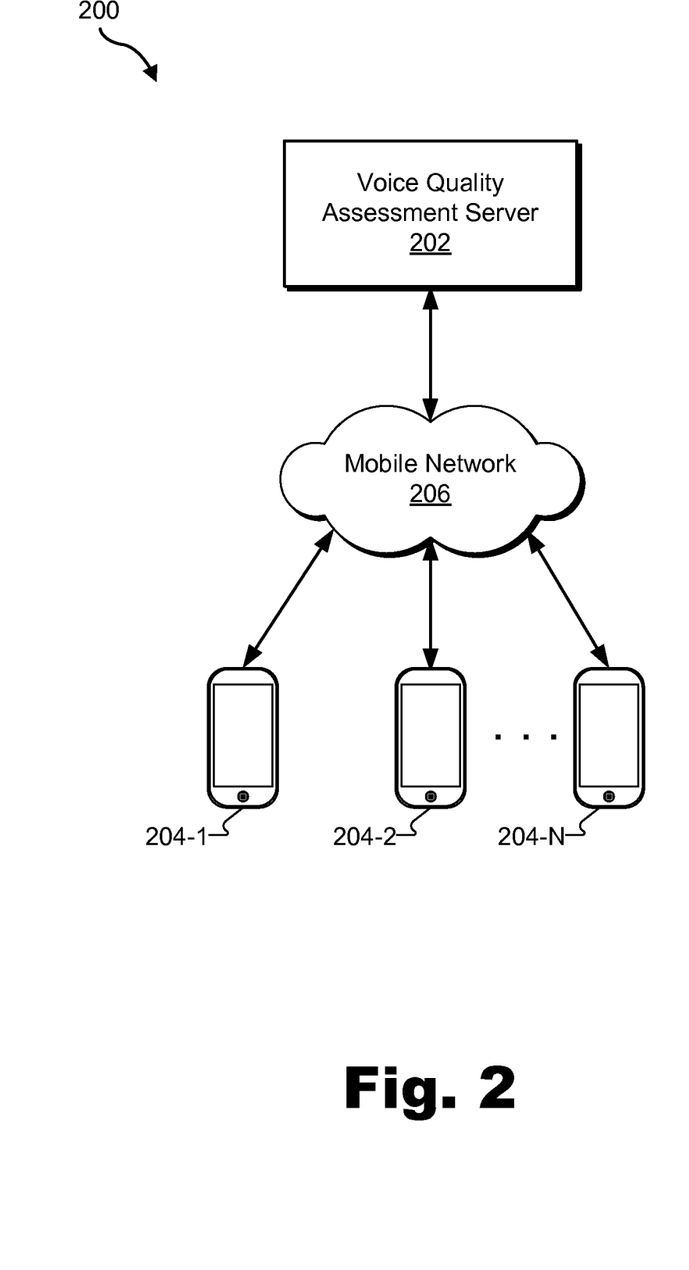
FIG. 2 shows an exemplary implementation of the system of FIG. 1 according to principles described herein.

FIG. 2 shows an exemplary implementation 200 of system 100. As shown, implementation 200 may include a voice quality assessment server 202 in communication with a plurality of mobile telephones 204 (e.g., mobile telephones 204-1 through 204-N) by way of a mobile network 206. In implementation 200, one or more of facilities 102-106 of system 100 may be implemented entirely by voice quality assessment server 202, or distributed across voice quality assessment server 202 and mobile telephone 204 in any manner.

Mobile network 206 may include a wireless network provided and/or managed by a mobile carrier. For example, mobile network 206 may include a 4G LTE network, a 3G network, a 2G network, and/or any other type of network that facilitates voice communications between mobile telephones 204.

Voice quality assessment server 202 and mobile telephones 204 may communicate by way of mobile network 206 (and/or any other type of network) using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Long Term Evolution ("LTE") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

Voice quality assessment server 202 may be implemented by one or more computing devices located remotely from mobile telephones 204. Voice quality assessment server 202 may be associated with (e.g., maintained and/or managed by) a provider of mobile telephone services (e.g., a mobile carrier). Voice quality assessment server 202 may alternatively be associated with any other entity as may serve a particular implementation.

Mobile telephones 204 may include any suitable mobile telephones configured to operate on mobile network 206. In some implementations, mobile telephones 204 may each include an application configured to measure network indicator data, device indicator data, RF data, and/or other types of data as may serve a particular implementation. The application may, for example, run in the background on each of mobile telephones 204 in a manner that is transparent to users of the mobile telephones 204.

In some examples, training facility 102 may build a voice quality model during a training phase in which data is collected from a plurality of mobile telephones and used to build the voice quality model. Testing facility 104 may use the voice quality model during a testing phase to generate voice quality scores for mobile telephones. In some examples, the training phase precedes and ends prior to the beginning of the testing phase. Alternatively, training phase and testing phase partially overlap in time. For example, the voice quality model may be dynamically updated over time, even as voice quality scores are generated for mobile telephones using the voice quality model.

Figure 3:
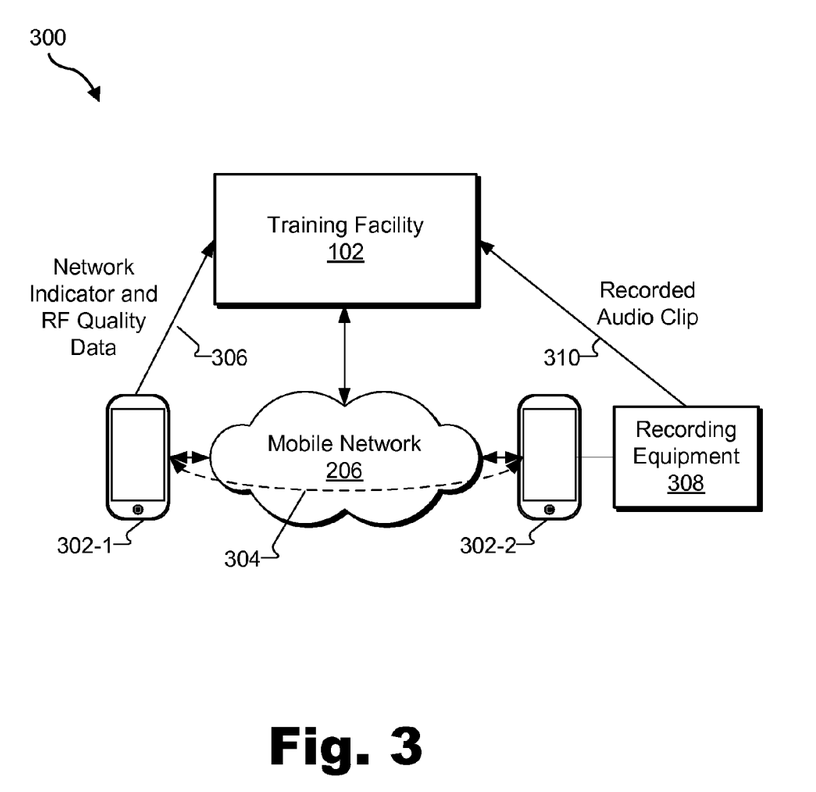
FIG. 3 shows an exemplary configuration in which a training facility directs a first mobile telephone to make a voice call to a second mobile telephone by way of mobile network according to principles described herein.

An exemplary training phase during which training facility 102 builds a voice quality model will now be described. During the training phase, training facility 102 directs a first set of mobile telephones operating on a mobile network to make voice calls to a second set of mobile telephones operating on the same mobile network. For example, FIG. 3 shows an exemplary configuration 300 in which training facility 102 directs a first mobile telephone 302-1 to make a voice call 304 to a second mobile telephone 302-2 by way of mobile network 206. Any number of mobile telephones may be included in the first and second sets of mobile telephones as may serve a particular implementation.

Each of the mobile telephones included in the first set of mobile telephones may include an application configured to include pre-selected audio clips in the voice calls. The pre-selected audio clips may each include a pre-recorded reference sentence (e.g., a List-11 Harvard Sentence) of any suitable length (e.g., ten seconds).

Training facility 102 may direct the first set of mobile telephones to each measure values for a plurality of network performance attributes of the mobile network (and, in some cases, device performance attributes) during the voice calls and values of an RF quality of the mobile network during the voice calls. The mobile telephones may transmit (e.g., at the direction of training facility 102) the measured values to training facility 102, as indicated in FIG. 3 by arrow 306.

Training facility 102 may record, by way of recording equipment connected to the second set of mobile telephones, the audio clips included in the voice calls made by the first set of mobile telephones. For example, training facility 102 may utilize recording equipment 308 to record the audio clip included in the voice call made by first mobile telephone 302-1 to second mobile telephone 302-2. The recorded audio clips may be transmitted by recording equipment 308 to training facility 102 (e.g., as indicated in FIG. 3 by arrow 310) in any suitable manner. The measured network performance attribute values, the measured RF quality values, and the recorded audio clip corresponding to a particular voice call may together constitute a training record associated with the voice call.

Training facility 102 may determine, based on the recorded audio clips, a POLQA score for each of the voice calls. This may be performed in any suitable manner. For example, training facility 102 may utilize a conventional POLQA system to compare the recorded audio clips to the pre-recorded reference sentences and generate the POLQA scores based on the comparisons.

Training facility 102 may assign each of the training records (i.e., each of the voice calls) to an RF quality class included in a plurality of RF quality classes associated with the voice quality model. This may be performed in any suitable manner. For example, training facility 102 may maintain an RF classification table that defines a plurality of RF classes based on RSRP and SINR values. Table 1 shows an exemplary RF classification table that may be maintained by training facility 102.

TABLE 1

| RF Class | RSRP (dbm) | SINR (db) | Description |
| --- | --- | --- | --- |
| Class 1 | >=−85 | >15 | Good coverage and low interference |
| Class 2 | >=−85 | <=15 | Good coverage and high interference |
| Class 3 | (−105, −85) | >15 | Median coverage and low interference |
| Class 4 | (−105, −85) | <=15 | Median coverage and high interference |
| Class 5 | <=−105 | >15 | Poor coverage and low interference |
| Class 6 | <=−105 | <=−15 | Poor coverage and high interference |

As shown in Table 1, a training record may be assigned to one of six RF classes based on the value of the RSRP and SINR values included in the training record. For example, if the RSRP value for a particular training record is −80 dbm and the SINR value for the particular training record is 20 db, the training record may be assigned to the RF class labeled "Class 1". It will be recognized that the RF classification table may have more or less than six RF classes, and that the boundaries of each class may vary as may serve a particular implementation. By assigning each training record to a particular RF class, training facility 102 may build a voice quality model that is capable of generating voice quality scores for voice calls made in a variety of different RF conditions.

Training facility 102 may select a subset of network and/or device performance attributes from the plurality of network performance attributes measured by the first set of mobile telephones that are most discriminative with respect to (i.e., that have the most impact on) a voice quality of each of the voice calls made by the first set of mobile telephones. As will be illustrated below, only the selected subset of network and/or device performance attributes will be measured and collected during the testing phase (as opposed to all of the plurality of network and/or device performance attributes measured during the training phase) in order to generate voice quality scores for mobile telephones.

Training facility 102 may select the subset of network performance attributes in any suitable manner. For example, training facility 102 may apply a spatial silhouette distance ("SSD") heuristic to the plurality of network performance attributes to select the subset of network performance attributes from the plurality of network performance attributes measured by the first set of mobile telephones.

To illustrate, training facility 102 may first divide all the training records into different quality groups based on the POLQA scores of the training records. Training facility 102 may then calculate the SSD for each network performance attribute in each quality group, and use the calculated SSD value to determine the discrimination capability of each network performance attribute within each quality group.

As an example, the training records may be divided into four groups C1 through C4 based on their POLQA scores as follows: C1: [0,2), C2: [2,3), C3: [3,4), and C4: [4.0, 4.5]. Assume that each group Ck (k=1; 2; 3; 4) has n records and each training record $r_j^k$ has m network performance attributes. In each quality group Ck, and for each network performance attribute point $R_{i,j}^k$ of each training record $r_j^k$, training facility 102 computes the Euclidean Distance ("ED") to all the other network performance attribute points in the same group, and obtains the average intra-group ED IntraED$_{i,j}^k$ for this network performance attribute point. Then, for a particular network performance attribute point, training facility 102 similarly computes its ED to network performance attribute points in all the other groups and calculates the average inter-group ED InterED for this network performance attribute point $R_{i,j}^k$. Training facility 102 similarly computes the average intra-group ED and inter-group ED for every network performance attribute point in the training records. Subsequently, for each quality group, training facility 102 averages out its intra-group ED over all the training records inside the group to obtain a group-wide average intra-group ED IntraED$_{i,j}^k$ and an inter-group ED InterED for each network performance attribute. Then for each quality group Ci, the SSD for each network performance attribute $R_{i,j}^k$ is given by the following equation.

$$S_i^k = \frac{InterED_i^k - IntraED_i^k}{\max\{InterED_i^k, IntraED_i^k\}}$$

For each network performance attribute $R_{i,j}^k$ in a quality group Ck, training facility 102 may use a tri-cube weight function to weight it as follows.

$$W_i^k = \begin{cases} \left(1 - \left|\sum_{i,j=1}^{4}(R_i^k - R_j^k)\right|^3\right)^3, & \text{if } \sum_{i,j=1}^{4}(R_i^k - R_j^k) < 1 \\ 0, & \text{if } \sum_{i,j=1}^{4}(R_i^k - R_j^k) \geq 1 \end{cases}$$

Training facility 102 may then obtain the SSD for each network performance attribute over all the RF groups in accordance with the following equation: $S_i = W_i^k \times S_i^k$.

After the SSD is obtained for all network performance attributes, network performance attributes with an SSD value greater than or equal to a predetermined threshold (e.g., 0.7) may be selected as the subset of network performance attributes that are most discriminative with respect to voice quality. It will be recognized that the predetermined threshold may be dynamically adjusted to any other value as may serve a particular implementation.

To illustrate, Table 2 shows SSD values for a number of network performance attributes that have been calculated in accordance with the preceding equations.

TABLE 2

| Network Performance Attribute | SSD |
|---|---|
| MAC.DL.Throughput | 0.8430 |
| PDSCH.Throughput | 0.8214 |
| RLC.DL.Throughput | 0.8057 |
| RTP.Audio.Rx.Throughput | 0.7934 |
| PDCP.DL.Throughput | 0.6922 |
| RTP.Audio.Tx.Throughput | 0.6842 |

As shown in Table 1, the first four network performance attributes have SSD values greater than a predetermined threshold of 0.7. Hence, the four network performance attributes may be selected as the subset of network performance attributes that are most discriminative with respect to voice quality. It will be recognized that the SSD values shown in Table 2 are exemplary only and that additional or alternative network performance attributes may have SSD values above the predetermined threshold as may serve a particular implementation.

Once the subset of network performance attributes that are most discriminative with respect to voice quality is selected, training facility 102 may use the selected network performance attributes to group the training records within clusters within each of the RF quality classes. This may divide the training records into groups, each representing different coverages, resource sufficiency and availability, etc. This may also allow the voice quality model to be customized to different network scenes (e.g., conditions, locations, etc.).

The clustering may be performed in any suitable manner. For example, training facility 102 may apply a K-Medoids clustering heuristic (or any other type of clustering heuristic) to the training records in order to group the training records within clusters within each of the RF quality classes.

The K-Medoids clustering heuristic may be configured to utilize one or more converging rules to identify the best number of clusters, k, to converge the voice quality model. To this end, training facility 102 may define an upper bound of cluster number u based on domain experience. Training facility 102 iterates k from 2 to u and performs K-Medoids clustering at each iteration. The optimal k is selected, such that the intra-cluster error is minimized and the inter-cluster distance is maximized, as follows:

$$\begin{cases} 0.7 \leq \frac{IntraSumOfError_{k+1}}{IntraSumOfError_k} \leq 1 \\ 0.7 \leq \frac{IntraSumOfError_{k+2}}{IntraSumOfError_{k+1}} \leq 1 \\ 0.7 \leq \frac{IntraSumOfError_{k+3}}{IntraSumOfError_{k+2}} \leq 1 \end{cases}$$

After all the training records have been assigned to different clusters, the clusters are regressed to the POLQA scores determined for each of the training records. In this manner, each cluster may be associated with a particular POLQA score. This may calibrate the voice quality model to generate voice quality scores that are within a predetermined percentage of voice quality scores generated by conventional POLQA systems.

The regression may be performed in any suitable manner. For example, training facility 102 may apply an Adaptive Local Weight Scatterplot Smoothing ("A-LOESS") heuristic to the clusters. A-LOESS adaptively computes a proper window size during the regression (as opposed to a fixed window size used in original LOESS). More specifically, training facility 102 groups the POLQA scores into different bins, and dynamically adjusts the window size for each local set by the distribution density of each bin. Based on domain experience in voice assessment in POLQA, training facility 102 selects nine bins according to the POLQA scale: bin0= [0; 0:5], bin1=(0:5; 1), bin2=[1; 1:5], : : : , bin8=(4:5; 5]. The initial window width is set to 1=100 of range of sample points, the scatterplot of all measured POLQA scores is plotted in an ascending order. Let f(x) denote the scatterplot function, where x is from 1 to the number of POLQA sample points. First, for each bin bina, training facility 102 computes its distribution density by integrating the value of the scatterplot function in its range as follows:

$$y_a = \int_{f^{-1}(0.5a)}^{f^{-1}(0.5a+0.5)} f(x)dx, (i=0, \ldots 8)$$

Training facility 102 may then sort ya in ascending order. Let S(ya)min represent the bin with minimum ya, S(ya)med represent the bin that has the median value of ya, and S(ya)max represent the bin with maximum ya. Training facility 102 may dynamically calculate the window size by the sorting results, as follows:

$$win_{size} = \begin{cases} \frac{0.5 + 0.125 * S}{100} * N, & \text{if } S = 0, \ldots, 4 \\ \frac{0.5 + 0.25 * (S-4)}{100} * N, & \text{if } S = 5, \ldots, 8 \end{cases}$$

Training facility 102 may use the adaptive window size calculated in the previous equation to perform LOESS regression to the POLQA scores based on the selected subset of network performance attributes.

The regression performed by training facility 102 may associate a POLQA score with each of the clusters included in each RF class. In this manner, during the testing phase, testing facility 104 may utilize the voice quality model to determine a voice quality score for a mobile telephone that is calibrated to (i.e., within a predetermined percentage of) a conventional POLQA score without having to record and analyze an audio clip included in a voice call made by the mobile telephone. Rather, as will now be explained, the voice quality score may be determined by collecting network indicator data, RF data, and, in some cases device indicator data, from the mobile telephone.

During the testing phase, testing facility 104 may determine voice quality scores for mobile telephones operating at different locations within the mobile network. The voice quality scores may be determined on a large scale basis (e.g., crowdsourcing) by providing applications that run in the background on mobile telephones to collect the network indicator data and the RF data used to generate the voice quality scores. Hence, the voice quality scores may be generated in a manner that is transparent to the users of the mobile telephones and without the need for specialized equipment (e.g., recording equipment) or substantial human effort.

Figure 4:
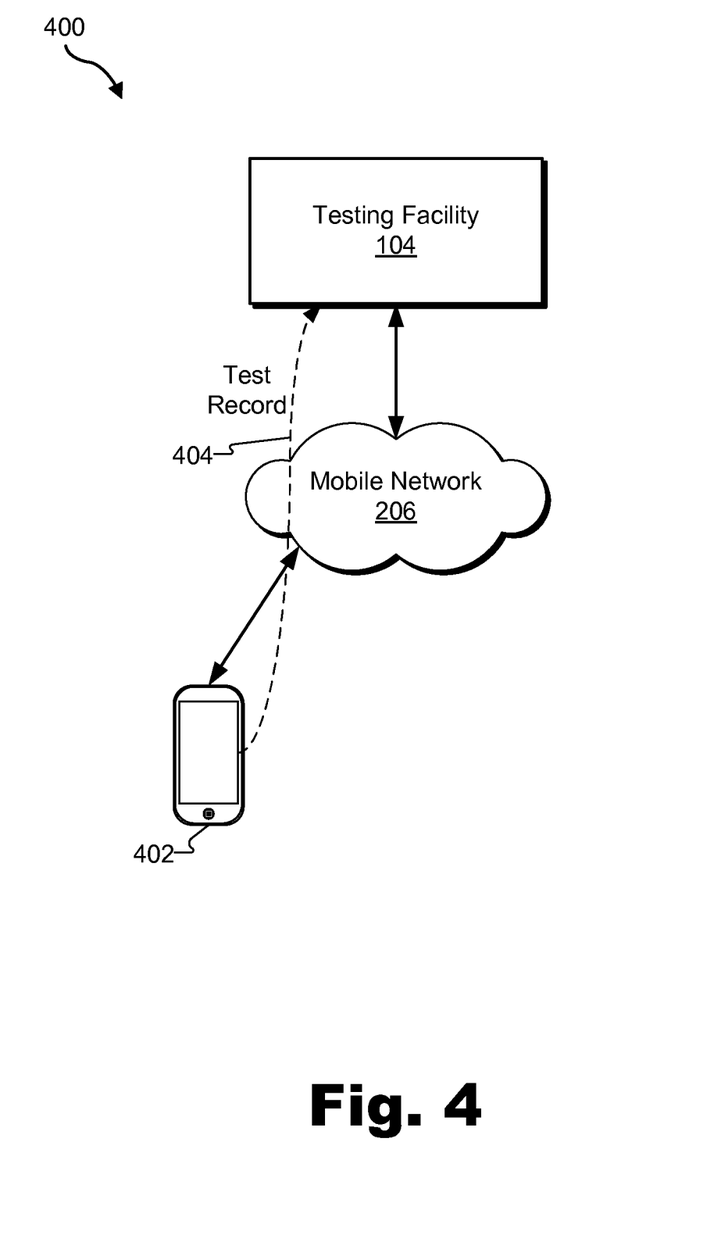
FIG. 4, which shows an exemplary configuration in which a testing facility generates a voice quality score for a mobile telephone that operates on a mobile network according to principles described herein.

To illustrate, reference is made to FIG. 4, which shows an exemplary configuration 400 in which testing facility 104 generates a voice quality score for a mobile telephone 402 that operates on mobile network 206. As illustrated by dashed line 404, testing facility 104 first receives a test record from the mobile telephone 402 that includes network indicator data, device indicator data, and RF data both measured by the mobile telephone 402 while the mobile telephone 402 is at a location (e.g., a geographic location) within the mobile network 206. The network and/or device indicator data may include data representative of values of the network and/or device performance attributes selected during the training phase as being most discriminative with respect to voice quality. The RF data may include data that indicates a signaling (e.g., wireless) coverage strength at the location within the mobile network (e.g., RSRP data) and data that indicates an interference condition at the location within the mobile network (e.g., SINR data).

Testing facility 104 may apply the network indicator data and the RF data to the voice quality model built in the training phase by training facility 102. For example, testing facility 104 may assign, based on the RF data, the test record to an RF quality class included in the plurality of RF quality classes that are a part of the voice quality model. To illustrate, testing facility 104 may assign the test record to one of the RF quality classes listed in Table 1 above based on the RSRP and SINR data included in the test record.

Testing facility 104 may then assign, based on the network indicator data, the test record to a cluster included in a plurality of clusters within the RF quality class to which the test record is assigned. For example, testing facility 104 may use the values of the network performance attributes included in the network indicator data to assign the test record to one of the clusters formed during the training phase using the K-Medoids clustering heuristic described herein. In some examples, testing facility 104 may further base the assignment of the test record to the cluster on device indicator data.

Testing facility 104 may then generate, based on the assigned cluster and the assigned RF quality class, a voice quality score that quantifies a quality of voice communications for the mobile telephone 402 at the location within the mobile network 206. This may be done in any suitable manner. For example, testing facility 104 may assign the mobile telephone 402 a POLQA score that has been associated with the assigned cluster during the training phase. Additionally or alternatively, a trained A-LOESS heuristic may be used to compute the voice quality score for mobile telephone 402.

Once testing facility 104 generates a voice quality score for a mobile telephone, testing facility 104 may use the voice quality score to assess and address one or more issues with the mobile network that may negatively impact the voice quality score. For example, testing facility 104 may generate a relatively low voice quality score for a mobile telephone operating at a certain location within the mobile network. Testing facility 104 may accordingly determine the location (e.g., analyzing global positioning system ("GPS") data provided by the mobile telephone, data that identifies a particular cell tower used by the mobile telephone, and/or any other suitable data) and analyze various network performance, device performance and/or RF quality attributes of the mobile network at the location. Based on the analysis, testing facility 104 may take a remedial action (e.g., by boosting a signaling strength at the location, generating a troubleshooting ticket used by network personnel to work on the mobile network at the location, etc.).

Figure 5:
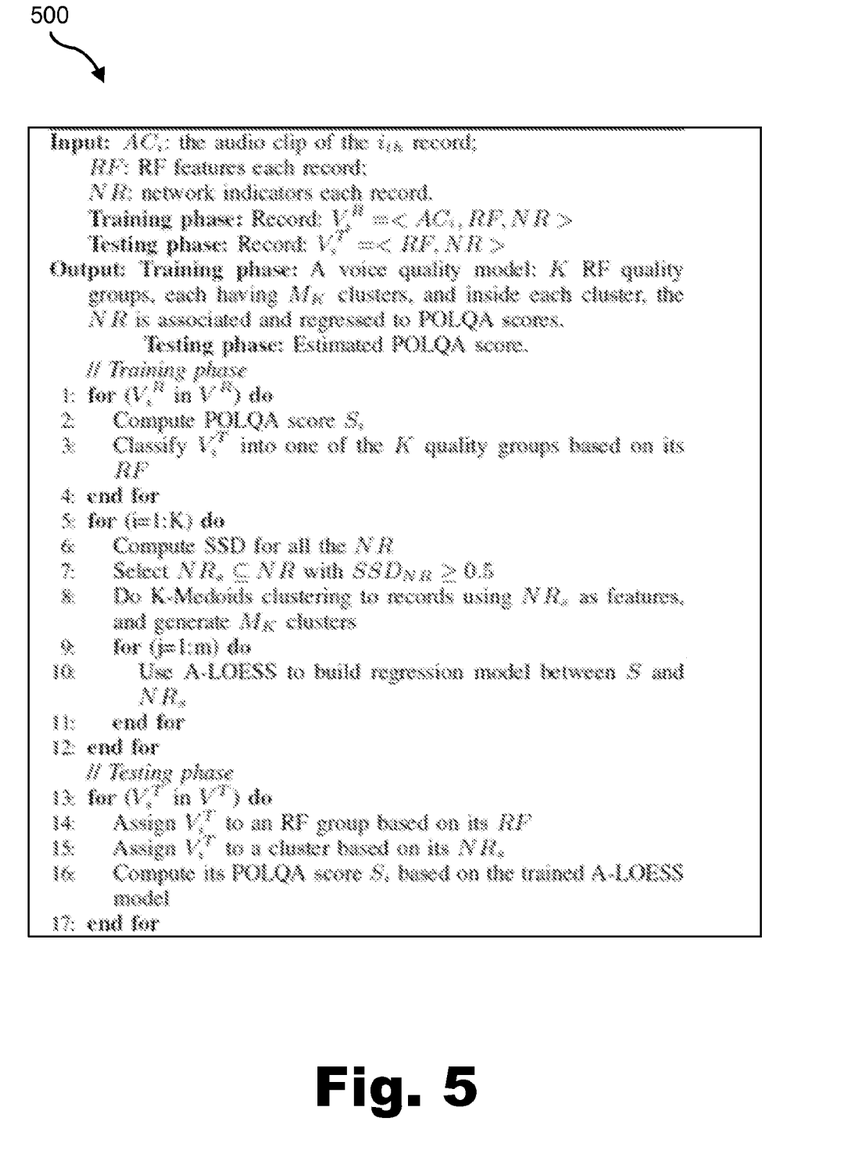
FIG. 5 shows a high level code structure that may be used to direct one or more computing devices to implement the training and testing phases described herein according to principles described herein.

The training and testing phases described herein may be implemented by one or more computing devices operating in accordance with software code configured to direct the one or more computing devices to perform the training and testing phases described herein. FIG. 5 shows a high level code structure 500 that may be used to direct one or more computing devices to implement the training and testing phases described herein. The lines labeled 1 through 12 in FIG. 5 correspond to the training phase and the lines labeled 13-17 correspond to the testing phase. It will be recognized that the code structure 500 is exemplary of the many different ways the training and testing phases may be implemented and that each of the steps shown in code structure 500 may be implemented by specific computer-readable code in any suitable manner.

Figure 6:
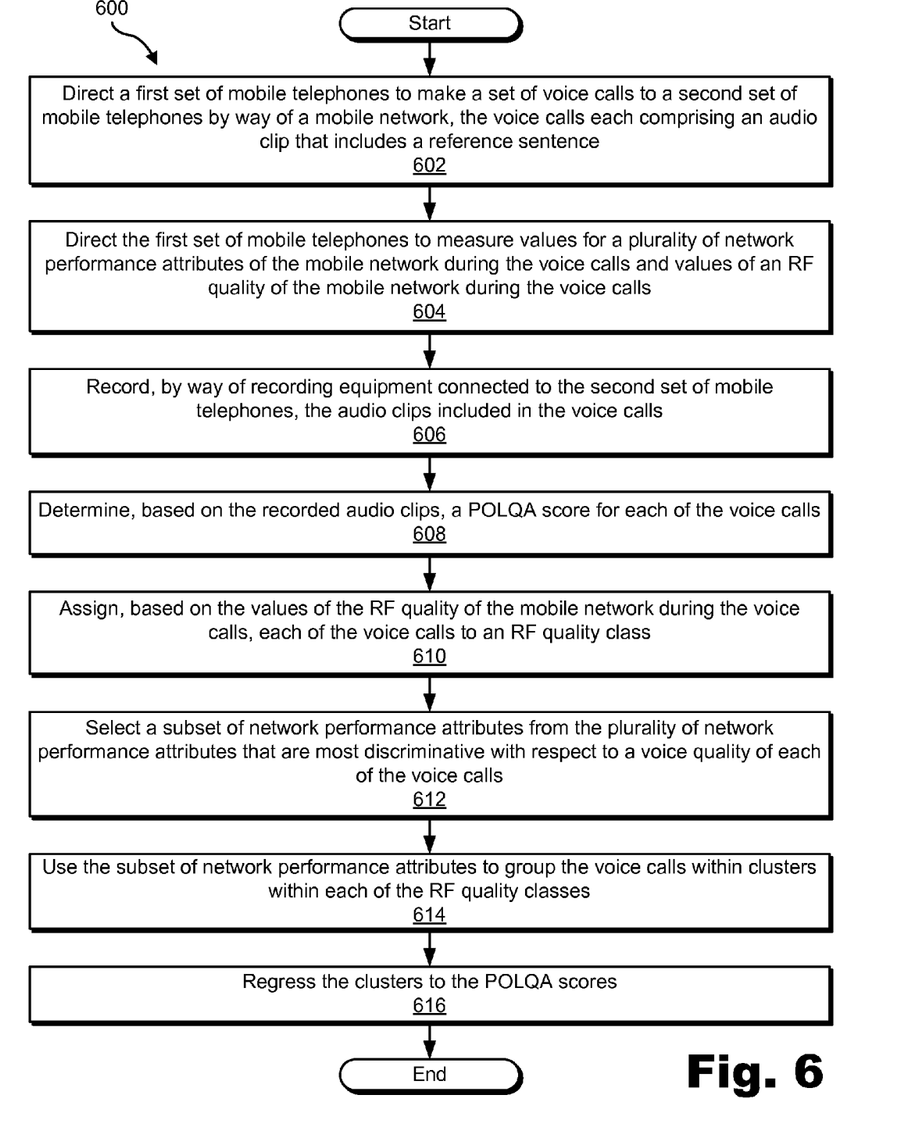
FIGS. 6-8 illustrate exemplary methods according to principles described herein.

FIG. 6 illustrates an exemplary method 600 of building a voice quality model for use in generating voice quality scores for mobile telephones that operate on a mobile network. While FIG. 6 illustrates exemplary steps according to one embodiment, other embodiments may omit, add to, reorder, and/or modify any of the steps shown in FIG. 6. One or more of the steps shown in FIG. 6 may be performed by system 100 and/or any implementation thereof.

In step 602, a voice quality assessment system directs a first set of mobile telephones to make a set of voice calls to a second set of mobile telephones by way of a mobile network, the voice calls each comprising an audio clip that includes a reference sentence. Step 602 may be performed in any of the ways described herein.

In step 604, the voice quality assessment system directs the first set of mobile telephones to measure values for a plurality of network performance attributes of the mobile network during the voice calls and values of an RF quality of the mobile network during the voice calls. Step 604 may be performed in any of the ways described herein.

In step 606, the voice quality assessment system records, by way of recording equipment connected to the second set of mobile telephones, the audio clips included in the voice calls. Step 606 may be performed in any of the ways described herein.

In step 608, the voice quality assessment system determines, based on the recorded audio clips, a POLQA score for each of the voice calls. Step 608 may be performed in any of the ways described herein.

In step 610, the voice quality assessment system assigns, based on the values of the RF quality of the mobile network during the voice calls, each of the voice calls to an RF quality class included in a plurality of RF quality classes. Step 610 may be performed in any of the ways described herein.

In step 612, the voice quality assessment system selects a subset of network performance attributes from the plurality of network performance attributes that are most discriminative with respect to a voice quality of each of the voice calls. Step 612 may be performed in any of the ways described herein.

In step 614, the voice quality assessment system uses the subset of network performance attributes to group the voice calls within clusters within each of the RF quality classes. Step 614 may be performed in any of the ways described herein.

In step 616, the voice quality assessment system regresses the clusters to the POLQA scores. Step 616 may be performed in any of the ways described herein. For example, the voice quality assessment system may apply the A-LOESS regression function for each cluster to derive the POLQA scores for each measurement point classified to the corresponding cluster.

Figure 7:
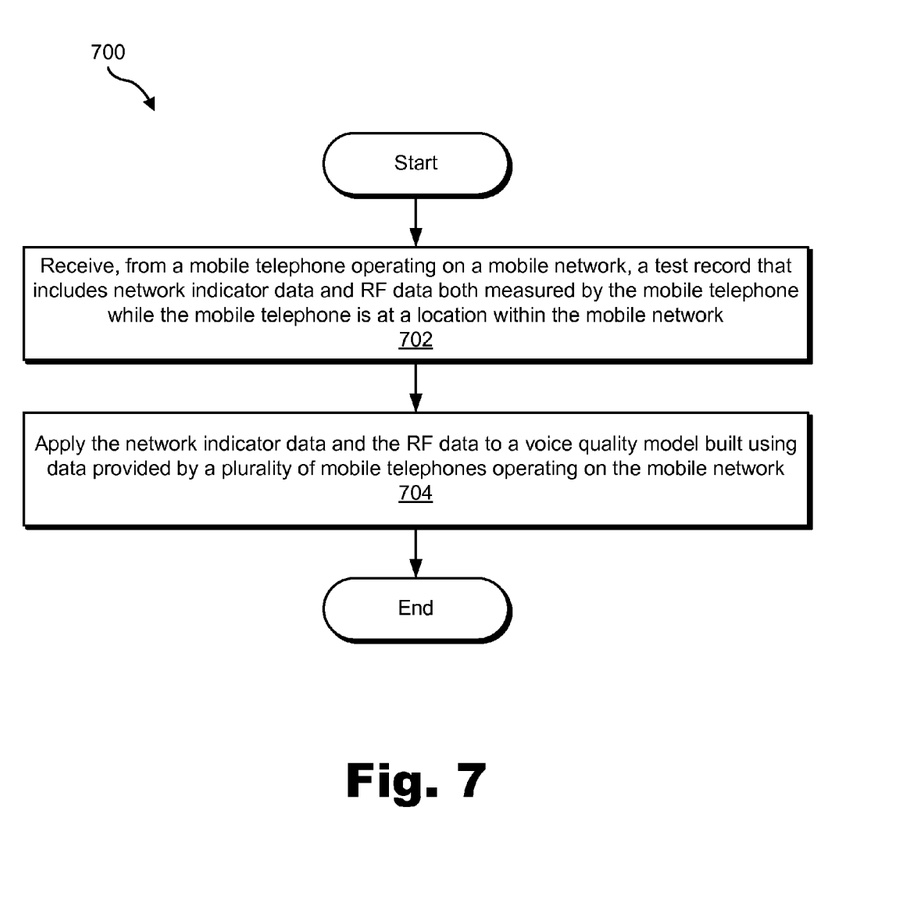

FIG. 7 illustrates an exemplary method 700 of determining a voice quality score for a mobile telephone that operates on a mobile network. While FIG. 7 illustrates exemplary steps according to one embodiment, other embodiments may omit, add to, reorder, and/or modify any of the steps shown in FIG. 7. One or more of the steps shown in FIG. 7 may be performed by system 100 and/or any implementation thereof.

In step 702, a voice quality assessment system receives, from a mobile telephone operating on a mobile network, a test record that includes network indicator data and RF data both measured by the mobile telephone while the mobile telephone is at a location within the mobile network. The network indicator data represents a value of a network performance attribute of the mobile network at the location within the mobile network and the RF data represents a value of an RF quality of the mobile network at the location within the mobile network. Step 702 may be performed in any of the ways described herein.

In step 704, the voice quality assessment system applies the network indicator data and the RF data to a voice quality model built using data provided by a plurality of mobile telephones operating on the mobile network. For example, the voice quality assessment system may apply the network indicator data and the RF data to the voice quality model built in method 600.

Figure 8:
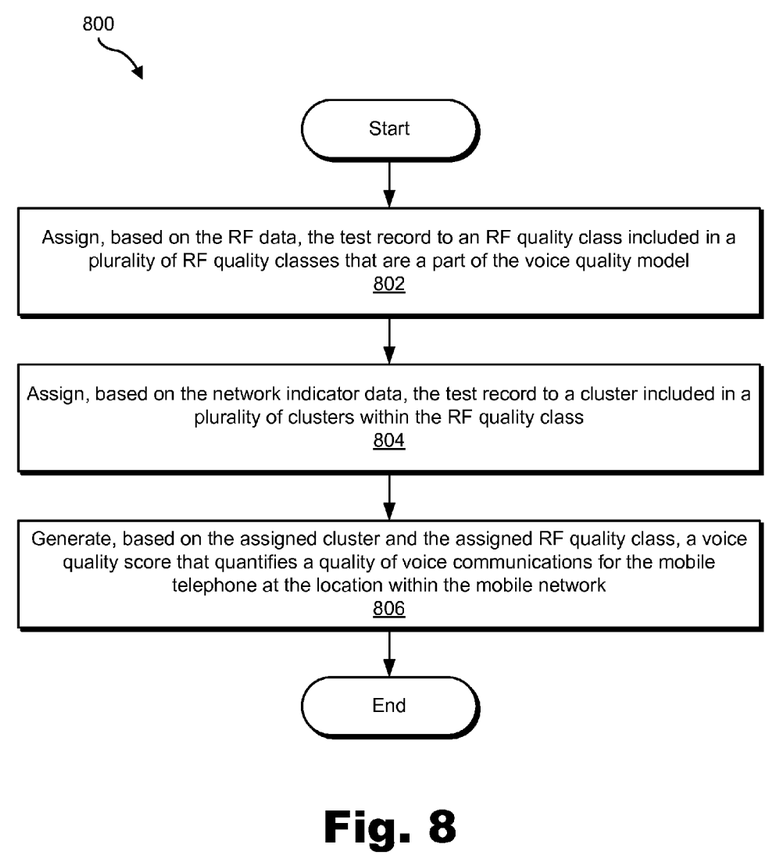

Step 704 may be performed in any of the ways described herein. For example, FIG. 8 shows an exemplary method 800 that may be used to perform step 704. While FIG. 8 illustrates exemplary steps according to one embodiment, other embodiments may omit, add to, reorder, and/or modify any of the steps shown in FIG. 8. One or more of the steps shown in FIG. 8 may be performed by system 100 and/or any implementation thereof.

In step 802, the voice quality assessment system assigns, based on the RF data, the test record to an RF quality class included in a plurality of RF quality classes that are a part of the voice quality model. Step 802 may be performed in any of the ways described herein.

In step 804, the voice quality assessment system assigns, based on the network indicator data, the test record to a cluster included in a plurality of clusters within the RF quality class. Step 804 may be performed in any of the ways described herein.

In step 806, the voice quality assessment system generates, based on the assigned cluster and the assigned RF quality class, a voice quality score that quantifies a quality of voice communications for the mobile telephone at the location within the mobile network. Step 806 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 9:
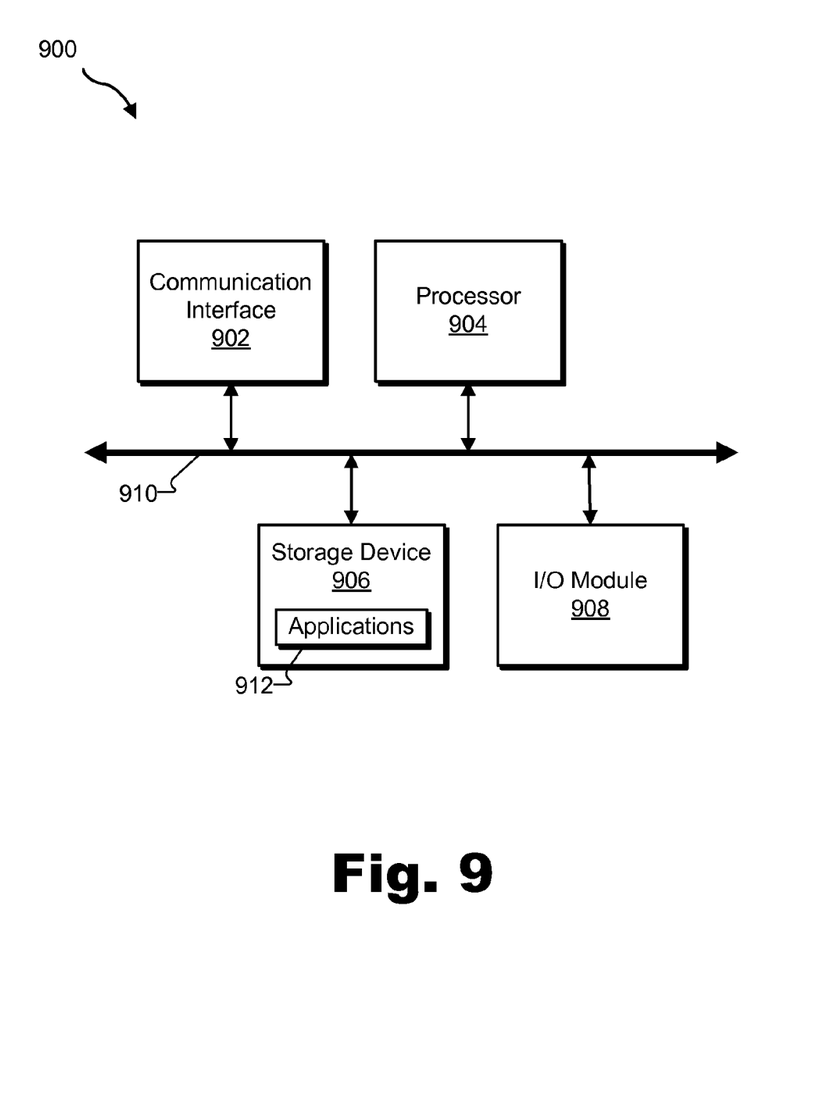
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with training facility 102 and testing facility 104. Likewise, storage facility 106 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a voice quality assessment system from a mobile telephone operating on a mobile network, a test record that includes network indicator data and radio frequency ("RF") data both measured by the mobile telephone while the mobile telephone is at a location within the mobile network, the network indicator data representing a value of a network performance attribute of the mobile network at the location within the mobile network and the RF data representing a value of an RF quality of the mobile network at the location within the mobile network; and applying, by the voice quality assessment system, the network indicator data and the RF data to a voice quality model built using data provided by a plurality of mobile telephones operating on the mobile network, the applying comprising assigning, based on the RF data, the test record to an RF quality class included in a plurality of RF quality classes that are a part of the voice quality model, assigning, based on the network indicator data, the test record to a cluster included in a plurality of clusters within the RF quality class, and generating, based on the assigned cluster and the assigned RF quality class, a voice quality score that quantifies a quality of voice communications for the mobile telephone at the location within the mobile network.

2. The method of claim 1, wherein the RF data comprises data that indicates a signaling coverage strength at the location within the mobile network and an interference condition at the location within the mobile network.

3. The method of claim 1, wherein the network indicator data comprises data indicative of at least one of a downlink throughput value, a physical downlink shared channel throughput value, a radio control link downlink throughput value, a real-time transport protocol ("RTP") audio transmission throughput value, an RTP audio receiving throughput value, a packet data convergence protocol downlink throughput value, an RTP audio receiving delay value, an RTP receiving jitter value, and a handover happening value.

4. The method of claim 1, further comprising calibrating, by the voice quality assessment system, the voice quality model to generate voice quality scores that are within a predetermined percentage of voice quality scores generated by a Perceptual Objective Listening Quality Assessment ("POLQA") system that compares recorded audio clips to reference sentences.

5. The method of claim 1, further comprising building, by the voice quality assessment system, the voice quality model prior to receiving the network indicator data and the RF data from the mobile telephone, the building of the voice quality model comprising:

directing a first set of mobile telephones to make a set of voice calls to a second set of mobile telephones, the voice calls each comprising an audio clip that includes a reference sentence;

directing the first set of mobile telephones to measure values for a plurality of network performance attributes of the mobile network during the voice calls and values of an RF quality of the mobile network during the voice calls;

recording, by way of recording equipment connected to the second set of mobile telephones, the audio clips included in the voice calls;

determining, based on the recorded audio clips, a Perceptual Objective Listening Quality Assessment ("POLQA") score for each of the voice calls;

assigning, based on the values of the RF quality of the mobile network during the voice calls, each of the voice calls to an RF quality class included in the plurality of RF quality classes;

selecting a subset of network performance attributes from the plurality of network performance attributes that are most discriminative with respect to a voice quality of each of the voice calls;

using the subset of network performance attributes to group the voice calls within clusters within each of the RF quality classes; and regressing the clusters to the POLQA scores.

6. The method of claim 5, wherein the selecting of the subset of network performance attributes comprises applying a spatial silhouette distance heuristic to the plurality of network performance attributes to select the subset of network performance attributes.

7. The method of claim 5, wherein the using the subset of network performance attributes to group the voice calls within the clusters within each of the RF quality classes comprises applying a K-Medoids clustering heuristic to the voice calls.

8. The method of claim 5, wherein the regressing of the clusters to the POLQA scores comprises applying an Adaptive Local Weight Scatterplot Smoothing ("A-LOESS") heuristic to the clusters.

9. The method of claim 5, wherein the network indicator data received from the mobile telephone comprises data representative of values of the subset of network performance attributes.

10. The method of claim 1, wherein:

the test record further includes device indicator data representing a value of a device performance attribute of the mobile telephone at the location within the mobile network; and the assigning of the test record to the cluster is further based on the device indicator data.

11. The method of claim 1, embodied as computer-executable instructions on at least one non-transitory computer-readable medium.

12. A method comprising:

building, by a voice quality assessment system, a voice quality model for use in generating voice quality scores for mobile telephones that operate on a mobile network, the building comprising directing a first set of mobile telephones to make a set of voice calls to a second set of mobile telephones by way of a mobile network, the voice calls each comprising an audio clip that includes a reference sentence, directing the first set of mobile telephones to measure values for a plurality of network performance attributes of the mobile network during the voice calls and values of a radio frequency ("RF") quality of the mobile network during the voice calls, recording, by way of recording equipment connected to the second set of mobile telephones, the audio clips included in the voice calls, determining, by the voice quality assessment system based on the recorded audio clips, a Perceptual Objective Listening Quality Assessment ("POLQA") score for each of the voice calls, assigning, based on the values of the RF quality of the mobile network during the voice calls, each of the voice calls to an RF quality class included in a plurality of RF quality classes, selecting a subset of network performance attributes from the plurality of network performance attributes that are most discriminative with respect to a voice quality of each of the voice calls, using the subset of network performance attributes to group the voice calls within clusters within each of the RF quality classes, and regressing the clusters to the POLQA scores.

13. The method of claim 12, further comprising:

receiving, by the voice quality assessment system subsequent to the building of the voice quality model and from a mobile telephone operating on the mobile network, a test record that includes network indicator data and RF data both measured by the mobile telephone while the mobile telephone is at a location within the mobile network, the network indicator data representing a value of a network performance attribute of the mobile network at the location within the mobile network and the RF data representing a value of an RF quality of the mobile network at the location within the mobile network; and applying, by the voice quality assessment system, the network indicator data and the RF data to a voice quality model by assigning, based on the RF data, the test record to an RF quality class included in a plurality of RF quality classes that are a part of the voice quality model, assigning, based on the network indicator data, the test record to a cluster included in a plurality of clusters within the RF quality class, and generating, based on the assigned cluster and the assigned RF quality class, a voice quality score that quantifies a quality of voice communications for the mobile telephone at the location within the mobile network.

14. The method of claim 12, embodied as computer-executable instructions on at least one non-transitory computer-readable medium.

15. A system comprising:

at least one physical computing device that receives, from a mobile telephone operating on a mobile network, a test record that includes network indicator data and radio frequency ("RF") data both measured by the mobile telephone while the mobile telephone is at a location within the mobile network, the network indicator data representing a value of a network performance attribute of the mobile network at the location within the mobile network and the RF data representing a value of an RF quality of the mobile network at the location within the mobile network; and applies the network indicator data and the RF data to a voice quality model built using data provided by a plurality of mobile telephones operating on the mobile network, wherein the at least one physical computing device applies the network indicator data and the RF data to the voice quality model by assigning, based on the RF data, the test record to an RF quality class included in a plurality of RF quality classes that are a part of the voice quality model, assigning, based on the network indicator data, the test record to a cluster included in a plurality of clusters within the RF quality class, and generating, based on the assigned cluster and the assigned RF quality class, a voice quality score that quantifies a quality of voice communications for the mobile telephone at the location within the mobile network.

16. The system of claim 15, wherein:

the test record further includes device indicator data representing a value of a device performance attribute of the mobile telephone at the location within the mobile network; and the assigning of the test record to the cluster is further based on the device indicator data.

17. The system of claim 15, wherein the network indicator data comprises data indicative of at least one of a downlink throughput value, a physical downlink shared channel throughput value, a radio control link downlink throughput value, a real-time transport protocol ("RTP") audio transmission throughput value, an RTP audio receiving throughput value, a packet data convergence protocol downlink throughput value, an RTP audio receiving delay value, an RTP receiving jitter value, and a handover happening value.

18. The system of claim 15, wherein the at least one physical computing device builds the voice quality model prior to receiving the network indicator data and the RF data from the mobile telephone by:

directing a first set of mobile telephones to make a set of voice calls to a second set of mobile telephones, the voice calls each comprising an audio clip that includes a reference sentence;

directing the first set of mobile telephones to measure values for a plurality of network performance attributes of the mobile network during the voice calls and values of an RF quality of the mobile network during the voice calls;

recording, by way of recording equipment connected to the second set of mobile telephones, the audio clips included in the voice calls;

determining, based on the recorded audio clips, a Perceptual Objective Listening Quality Assessment ("POLQA") score for each of the voice calls;

assigning, based on the values of the RF quality of the mobile network during the voice calls, each of the voice calls to an RF quality class included in the plurality of RF quality classes;

selecting a subset of network performance attributes from the plurality of network performance attributes that are most discriminative with respect to a voice quality of each of the voice calls;

using the subset of network performance attributes to group the voice calls within clusters within each of the RF quality classes; and regressing the clusters to the POLQA scores.

19. The system of claim 18, wherein the selecting of the subset of network performance attributes comprises applying a spatial silhouette distance heuristic to the plurality of network performance attributes to select the subset of network performance attributes.

20. The system of claim 18, wherein the using the subset of network performance attributes to group the voice calls within the clusters within each of the RF quality classes comprises applying a K-Medoids clustering heuristic to the voice calls.

* * * * *